US012661814B2

(12) United States Patent
Zehetner et al.

(10) Patent No.: US 12,661,814 B2
(45) Date of Patent: Jun. 23, 2026

(54) STAMP WITH A CUTTING DEVICE AND METHOD FOR USING A CUTTING DEVICE

(71) Applicant: Trodat GmbH, Wels (AT)

(72) Inventors: Markus Zehetner, Leonding (AT); Helmut Lindner, Peuerbach (AT)

(73) Assignee: Trodat GmbH, Wels (AT)

( * ) Notice: Subject to any disclaimer, the term of this patent is extended or adjusted under 35 U.S.C. 154(b) by 103 days.

(21) Appl. No.: 18/864,199

(22) PCT Filed: Apr. 6, 2023

(86) PCT No.: PCT/AT2023/060117
§ 371 (c)(1),
(2) Date: Nov. 8, 2024

(87) PCT Pub. No.: WO2023/215924
PCT Pub. Date: Nov. 16, 2023

(65) Prior Publication Data
US 2025/0296253 A1 Sep. 25, 2025

(30) Foreign Application Priority Data
May 11, 2022 (AT) .............................. A 50332/2022

(51) Int. Cl.
*B26B 1/04* (2006.01)
*B41K 1/00* (2006.01)

(52) U.S. Cl.
CPC ................ *B26B 1/04* (2013.01); *B41K 1/003* (2013.01)

(58) Field of Classification Search
CPC .............. B26B 1/04; B41K 3/68; B41K 1/003
See application file for complete search history.

(56) References Cited

U.S. PATENT DOCUMENTS 109,792 A * 11/1870 Zantzinger ............... B41K 1/56 101/406
211,627 A * 1/1879 Gelastt ..................... B41K 1/50 101/374
218,622 A * 8/1879 Greene ..................... B26F 1/40 101/30

(Continued)

FOREIGN PATENT DOCUMENTS

| | | | |
|---|---|---|---|
| CN | 214727594 | 11/2021 | |
| DE | 19632280 | 2/1997 | |
| JP | WO2012108515 | * 2/2012 | .............. B41K 1/02 |

OTHER PUBLICATIONS

International Search Report and Written Opinion, translation of search report included, for International Application No. PCT/AT2023/060117, mailed Aug. 23, 2023, 9 pp.

*Primary Examiner* — Sean M Michalski
(74) *Attorney, Agent, or Firm* — KOWERT, HOOD, MUNYON, RANKIN & GOETZEL, P.C.; Gareth M. Sampson

(57) ABSTRACT

A method and a stamp with a cutting device a grip area arranged on an outer housing of a top part, and a receiving area, in which an ink application device is arranged, are disclosed. The cutting device and an associated actuating mechanism are arranged on the top part and the actuating mechanism is designed for activating and/or locking the cutting device. The actuating mechanism and the cutting device are arranged at opposite corner regions of the top part and connected to each other via a pivoting mechanism.

18 Claims, 6 Drawing Sheets

(56) References Cited

U.S. PATENT DOCUMENTS

| | | | | | |
|---|---|---|---|---|---|
| 388,437 | A * | 8/1888 | Norrington | B41K 1/04 | 101/109 |
| 570,264 | A * | 10/1896 | Otteson | B41K 1/10 | 101/111 |
| 653,366 | A * | 7/1900 | Skinner | B23D 29/005 | 30/277 |
| 3,306,192 | A * | 2/1967 | McFarland | B41K 1/12 | 101/108 |
| 4,939,990 | A * | 7/1990 | Inaguma | B41K 1/08 | 101/93.37 |
| 5,778,776 | A * | 7/1998 | Fuwa | B41K 1/32 | 101/125 |
| 5,806,713 | A * | 9/1998 | Dudley | B65H 37/005 | 221/73 |
| 5,974,969 | A * | 11/1999 | Okumura | B41K 1/38 | 101/108 |
| 6,012,861 | A * | 1/2000 | Makino | B41K 3/102 | 400/175 |
| 8,336,454 | B2 * | 12/2012 | Ushijima | B41K 1/24 | 101/328 |
| 2011/0146513 | A1 * | 6/2011 | Yeomans | B41K 1/56 | 101/483 |
| 2011/0174175 | A1 * | 7/2011 | Ushijima | B41K 1/22 | 101/333 |
| 2011/0192299 | A1 * | 8/2011 | Anthony | B41K 1/42 | 101/333 |
| 2012/0017789 | A1 * | 1/2012 | Yeomans | B26B 5/00 | 101/405 |
| 2018/0001588 | A1 * | 1/2018 | Katharani | B41K 1/04 | |
| 2026/0048603 | A1 * | 2/2026 | Shih | B41K 1/003 | |

* cited by examiner

STAMP WITH A CUTTING DEVICE AND METHOD FOR USING A CUTTING DEVICE

TECHNICAL FIELD

The present disclosure relates to a stamp with a cutting device and a method for using a cutting device.

DESCRIPTION OF THE RELATED ART

A stamp with a box opener is already known from CN 214727594 U, where a blade with a sliding mechanism is arranged centrally. Here, the blade and the push rod for actuation are guided and connected to each other so that the blade is pushed out of the housing when the push rod is pushed towards the outside of the housing. The actuating element or push rod is arranged parallel to the broad side of the blade and moves in the same direction as the sliding of the blade.

The disadvantage of this is that a cutting mechanism designed in this way can be used only to a very limited extent for a few types of stamps without significantly increasing the size of the stamp and thus leads to higher material consumption, higher costs, higher environmental impact and optical or haptic disadvantages. However, the central arrangement of the blade and the push rod not only requires a relatively large amount of space, but also makes cutting very awkward. In particular, the border areas of the upper side of the stamp interfere, which means that the blade can cut only at a relatively steep angle to the object to be cut. A further disadvantage is that the force of the return spring acts obliquely on the extended blade, and tilting may result, with this solution.

Furthermore, WO 2012/108515 A1 discloses a stamp with a letter opener, in which one exemplary embodiment (FIG. 29) includes a blade that can be pushed out. The mechanism is formed similar to the one in CN 214727594 U. Here, too, the blade is recessed in the stamp in the starting position and can be moved into the actuating position for cutting letters and the like by sliding it out of the housing. It is pushed out in a straight line by moving the actuating element and the blade connected to it. The disadvantage here is that the cutting device or blade must be manually lowered into the housing by a return movement of the actuating element, which poses safety risks. Moreover, such a solution is limited to use in a stamp with a narrow lateral face or is very inconvenient to use in a stamp with a larger lateral face, as disclosed in CN 214727594 U. In case of a narrow lateral face—as shown in FIG. 29—there are in turn disadvantages in handling during the stamping process, as the grip element has to fulfill a technical function, and the gripping comfort suffers as a result. In addition, when the blade is extended, it protrudes directly towards the user when standing at the desk with the closure cap in place. In addition, it is not possible to clearly see in advance which direction the cutting side of the blade is facing when it is extended, which in turn leads to disadvantages in terms of handling and safety.

Furthermore, the above-mentioned WO 2012/108515 A1 and KR 2010 0108483 A also disclose rigidly mounted blades and blades without actuating devices. Here the blades are installed in a slot, whereby, when a letter is inserted into the slot and pulled through, the same is slit up or opened. The disadvantage is that only very narrow objects can be processed in this way with the blade. The disadvantage here is that this application is severely limited to the opening of letters, and even opening of letters of greater width is problematic.

Finally, there is also a stamp with the product name "PLUS Guard Your ID," which is available also in a version with a fold-out blade (GYID—Guard Your ID 3-in-1 Advanced Wide Security Roller) (see https://plus-america-.com/products/guard-your-id-3-in-1-wide-advanced-roller-2-pack)

This is designed in such a way that a knife or blade is built into the side surface, which is gripped laterally by a mechanism similar to a folding knife and folded towards the upper side of the housing and locks in the unfolded position. The blade is released by pressing a lever, also located on the top, and can be folded back into the housing manually. The disadvantage here is the risk of injury due to the blade being locked in the activated or extended state, i.e. rigid. Even if the cutting edge of the blade is comparatively blunt, there is still a risk of injury, especially for children. As the cutting edge of the knife must not be sharp due to safety regulations, there are in turn restrictions on its use. According to the manufacturer, the blade is used to open envelopes and parcels. Further disadvantages are that a larger recess is provided on the side of the stamp housing for lateral gripping with the fingers, which also greatly reduces the types of stamps for which such a solution can be implemented in the first place without enlarging the housing or providing corresponding protrusions, which would lead to higher material consumption, higher costs, higher environmental impact, and losses in terms of product shape or handling.

The disadvantages of the previously known stamps with cutting devices therefore include the fact that the known cutting devices are inconvenient to operate.

SUMMARY OF EMBODIMENTS

The objective of the disclosed embodiments is to create a stamp with a cutting device and a method for cutting, in which, on the one hand, the above-mentioned disadvantages are avoided and, on the other hand, user-friendliness is increased.

The objective is achieved by the disclosed embodiments. Advantageous embodiments and/or process measures are described in the dependent claims.

The objective of the disclosed embodiments is achieved by a stamp with a cutting device, in which the actuating mechanism and the cutting device are arranged at opposite corner regions and connected to each other via a pivoting mechanism.

The advantage here is that the cutting comfort for the user is significantly increased, especially in the preferred cutting position (FIG. 1*c*). Thanks to the opposing arrangement, users with small hands can easily operate the cutting device or the actuating knob, even on larger stamp models. The stamp also feels better when resting in the user's hand. Further advantages lie in the wide range of possible applications of the cutting device for various types and designs of stamps, as this arrangement of the cutting device including actuation can be installed relatively compactly in the top part of the stamp. This leaves sufficient space for the sometimes-complex components of the ink application device.

In another advantageous embodiment the pivoting mechanism is formed from at least one pivot lever, to which the cutting device is attached, and the actuating element, as this facilitates assembly. The at least two-part design of the pivoting mechanism means that the pivot lever can be installed in the stamp, and the actuating element or the external actuating knob can then be attached or inserted.

This permits a one-piece design of the top part, which simplifies assembly due to a lower number of components.

Advantageous embodiments are also such in which the cutting device is rigidly attached to the pivot lever. This reduces the risk of injury to the user of the cutting device and prevents unintentional shaking during cutting. It is advantageous if the cutting device has little or no play in the pivot lever when attached, as this ensures a precise cutting process or guidance of the knife. The cutting device is preferably connected detachably to the pivot lever, but alternatively it can be fixed, e.g. molded or glued in.

Furthermore, a design in which the pivot lever includes an opening for receiving the actuating mechanism can advantageously achieve easy assembly of the actuating mechanism by inserting it into the opening. To this end, a latching device is provided for attachment of the actuating mechanism. This allows the actuating mechanism to be connected to the pivot lever inside the top part from the outside.

Advantageous embodiments are also such in which the actuating mechanism or the pivot lever includes an extension on which a latching element is arranged for connecting the actuating mechanism to the pivot lever, as this makes assembly easier. In this way, either the pivot lever can be inserted into the stamp housing and the actuating mechanism with the extension be pushed in from the outside, or an extension arranged on the pivot lever can be pushed from the inside of the stamp housing to the outside or from the outside to the inside and the actuating element attached to the same. The arrangement of the latching element permits assembly to be achieved without complex tools.

In further advantageous embodiments the pivot lever includes a recess that is connected to the opening of the pivot lever to form a latching edge for the latching element of the actuating mechanism, as a latching connection is thereby realized in a simple manner and a simple assembly of the pivoting mechanism achieved. Preferably, this latching connection is designed so as to be detachable.

Advantageous embodiments are also such in which a pivoting mechanism, in particular the pivot lever, includes a bearing axle for mounting in the top part, which is arranged between the actuating mechanism and the cutting device, whereby the bearing axle is preferably arranged in the rear half of the pivoting mechanism, i.e. that half in which the actuating mechanism is arranged. The advantage of this is that pressing the actuating mechanism in the direction of the underside of the stamp causes the cutting device to pivot in the direction of the upper side of the stamp. The pivoting movement of the cutting device is therefore essentially in the opposite direction to the pivoting movement of the actuating mechanism, which in turn reduces the risk of injury. A further advantage is that by varying the arrangement of the bearing axle, the force required to activate or actuate the actuating mechanism on the one hand and the pivoting movement of the cutting device on the other can be changed, or precisely adjusted during manufacture.

In another advantageous embodiment, a bearing means is arranged or can be used for fastening and mounting the pivot lever on the top part. This ensures better guidance of the pivoting movement and less wear on the pivoting mechanism. If one of the bearing means is arranged so as to be detachable, further advantages in terms of ease of assembly result. This makes it possible to install the pivot lever in a one-piece top part, since preferably one part of the bearing is formed on the top part and the second part of the bearing is formed by the bearing means, so that the pivot lever is simply inserted into the first part in the top part and then the bearing means, which preferably includes latching elements, is inserted and latched in the top part.

Furthermore, an embodiment is advantageous in which the cutting device or the pivot lever is held in the starting position against the actuating position by a retaining or return mechanism, in particular a return spring, since this achieves an automatic return of the cutting device to the top part, so that the risk of injury to the user can be avoided. In the initial position, the cutting device is preferably arranged inside the housing of the stamp. The cutting device does not protrude beyond the outside of the stamp. Thus, the cutting device is active only when it is deliberately moved into the actuating position by the user, and automatically pivots back into the starting position when the actuating device is released.

An advantageous design can also be achieved by having the retaining or return mechanism for the pivot lever attached in the top part or an insertion element, as this means that the retaining or return mechanism is attached to a part or element positionally fixated, and the retaining or return mechanism is thus always held in relation to it. Preferably, the retaining or return mechanism is designed as a tension element or tension spring, but it can also be designed as a compression element or compression spring.

Another advantageous embodiment is one in which the pivot lever includes a fastening means for fastening the retaining or return mechanism, which is preferably arranged on the underside of the pivot lever. This allows for easier assembly, for example by using a tension spring as a return spring.

In another advantageous embodiment, the stamp is a roller stamp, self-inking stamp, flash stamp or pre-ink stamp, whereby the stamp, in particular its top part, preferably has an essentially rectangular, square, oval or round cross-sectional shape. This permits the user to be provided with a wide variety of different stamp models and shapes with the cutting device according to the disclosed embodiments. All that is required here is sufficient space in the interior space of the stamp for installation of the cutting device, which is indeed available in most of these stamp models, in particular in the case of a rectangular, square, oval or round cross-sectional shape of the stamp model, and in view of the narrow design of the cutting device according to the disclosed embodiments, without necessitating a significant increase in the overall height of the stamp.

In another advantageous embodiment, a roller or roll is arranged on the insertion element for applying ink, in particular in the form of letters, symbols or images, as the design of the ink dispensing device as a roller means that no moving parts pivot into the interior of the stamp, leaving more space for the arrangement of the cutting device. Thus, the ratio of load arm to force arm of the pivoting mechanism and/or the length and angle of the return spring can be selected more freely, and hence the pivoting angle of the cutting device and the force required to activate the actuating device can be better adjusted or controlled.

In another advantageous embodiment, an additional cutting device is arranged in the top part, which includes a slit-shaped cutout, preferably for opening letters. This increases the application possibilities and provides professional cutting options for a variety of applications.

An embodiment in which a closure cap can be attached to the top part to cover the ink application device is also advantageous, as the ink application device can thus be covered with the closure cap during the cutting process and the user does not come into contact with the ink of the ink application device during cutting.

It is also advantageous if the frame structure of the housing of the top part is designed in one piece, as this makes the stamp housing and the cutting mechanism more robust and durable. Other elements or parts can of course be arranged on the housing of the top part as well, such as a viewing window with the imprint image, etc. Furthermore, parts or surfaces can be designed to be removable, such as removable lateral surfaces, allowing better access during assembly. Preferably, the frame structure of the housing itself is designed as a single piece, i.e. in particular not formed by, for example, two half-shells that can be plugged together.

Furthermore, the objective of the disclosed embodiments is also achieved by a method for using a cutting device of a stamp, in which upon activation of the actuating mechanism the same is pivoted against the direction of movement of the cutting device, where the actuating mechanism is pivoted in the direction of the closure cap or ink application device, whereby upon deactivation the actuating mechanism is returned to the starting position, in which the cutting device is arranged inside the top part, via a retaining or return mechanism.

The advantage of this is that, in particular due to the opposing pivoting of the cutting device and the actuating mechanism and the return of the cutting device, a risk of injury to the user is avoided and simple and convenient use and handling achieved.

Finally, measures in which individual features of the solution according to the embodiments disclosed above are arranged or formed on the stamp are also advantageous. As a result, the advantages mentioned in each case can be realized accordingly.

The invention will now be described in the form of exemplary embodiments, whereby it is pointed out that the invention is not limited to the exemplary embodiments or solutions shown and described, but can be transferred to equivalent solutions.

By way of introduction, it should be noted that in the various embodiments, identical parts are provided with identical reference signs or identical component designations, respectively, and the disclosures contained in the entire description can be applied mutatis mutandis to identical parts with identical reference signs or identical component designations, respectively. The positional information selected in the description, such as top, bottom, side, etc., likewise refers to the figure described and is to be transferred to the new position mutatis mutandis in the event of a change of position.

DETAILED DESCRIPTION OF EMBODIMENTS

Figure 5:
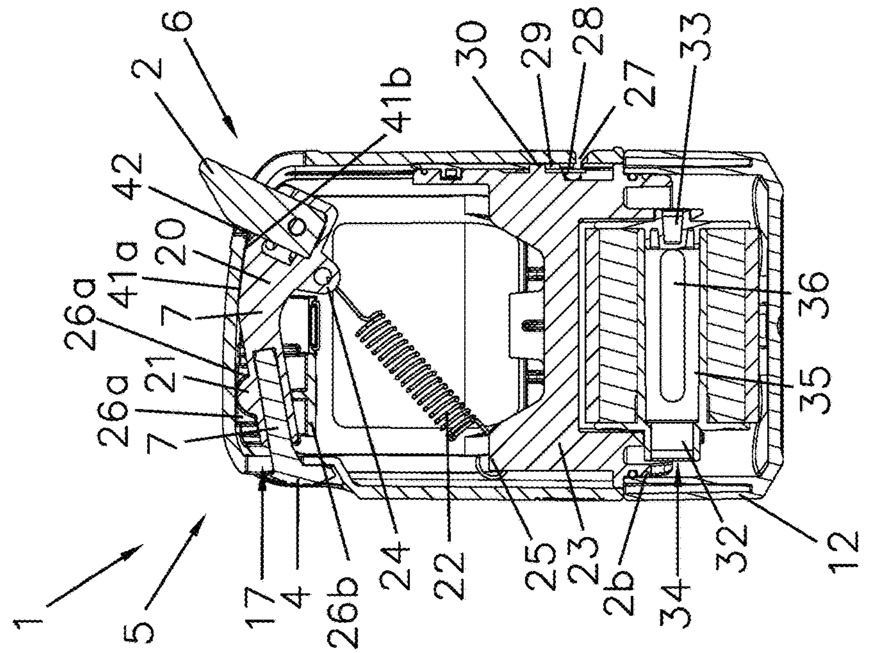
FIG. 5 is a sectional view of the stamp according to lines A-A in FIG. 2*a* with activated actuating mechanism or activated cutting device—simplified, for illustrative purposes only.

FIGS. 1*a* to 8 show an exemplary embodiment of a stamp 1, in particular a rolling or roller stamp, with a cutting device 2 that is arranged on a top part 3 and can be activated via an actuating mechanism 4, i.e. when the actuating mechanism 4 is actuated, the cutting device 2, which is recessed in the housing or top part 3 of the stamp 1 in the resting position, is pushed out of the housing or protrudes from the top part 3. The outer housing of the top part 3 is preferably made in one piece, but can also be formed from several parts, e.g. half-shells that can be plugged together, etc. FIGS. 1*c* and 5 show the cutting device 2 in the activated position, while in FIGS. 1*a*, 1*b*, 2*a*, 2*b*, 3, 4 and 8 the cutting device 2 is shown in the resting position, in which it is completely retracted into the top part 3 of the stamp 1 and does not protrude beyond the outer surface of the stamp 1. The actuating mechanism 4 and the cutting device 2, in particular the opening for the cutting device 2, are arranged at opposite corner regions 5, 6 and connected to each other via a pivoting mechanism 7 (FIG. 2*b*). The corner regions 5, 6 are formed by the near area in the transition area of an upper side 8 of the top part 3 to an adjacent side surface 9. The actuating mechanism 4 and the cutting device 2 can therefore be arranged at opposite end regions of the upper side 8 of the top part 3, and/or at the side faces 9 of the top part 3 directly adjacent thereto and/or directly in the corners formed by the upper side 8 and the adjacent lateral surface 9. However, it is not necessary for the actuating mechanism 4 and the cutting device 2 to be arranged at the same position in the corner area 5, 6. In the exemplary embodiment shown, for example, the actuating mechanism 4 is largely arranged on the lateral surface 9, whereas the cutting device 2 or the opening is largely arranged in the end region of the upper side.

The top part 3 of the stamp 1, in particular the upper side 8 and/or the adjoining side surface 9, serves as a pressure or grip area 10 for the user of the stamp 1 during the stamping process. Furthermore, an additional cutting device 11, which is preferably designed as a letter opener, can also be arranged on the top part 3 of the stamp 1.

Figure 1B:
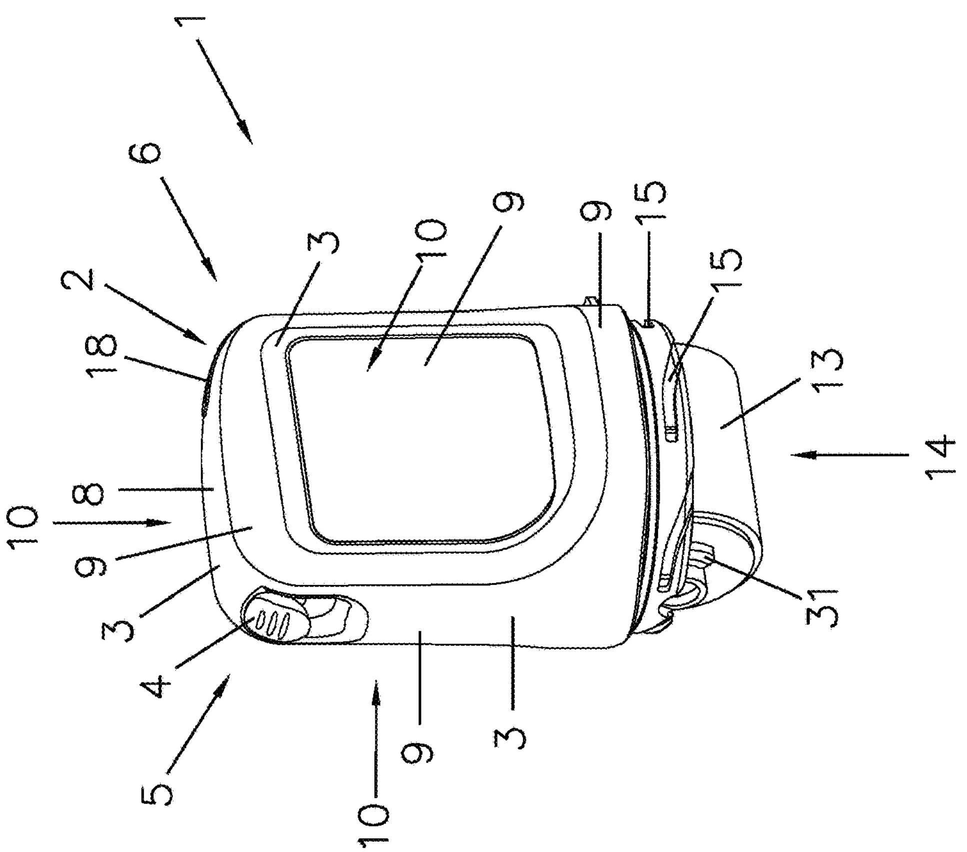
FIG. 1*b* is an illustration of the stamp, in particular a roller stamp, in the stamping position in oblique view—simplified, for illustrative purposes only.
Figure 1A:
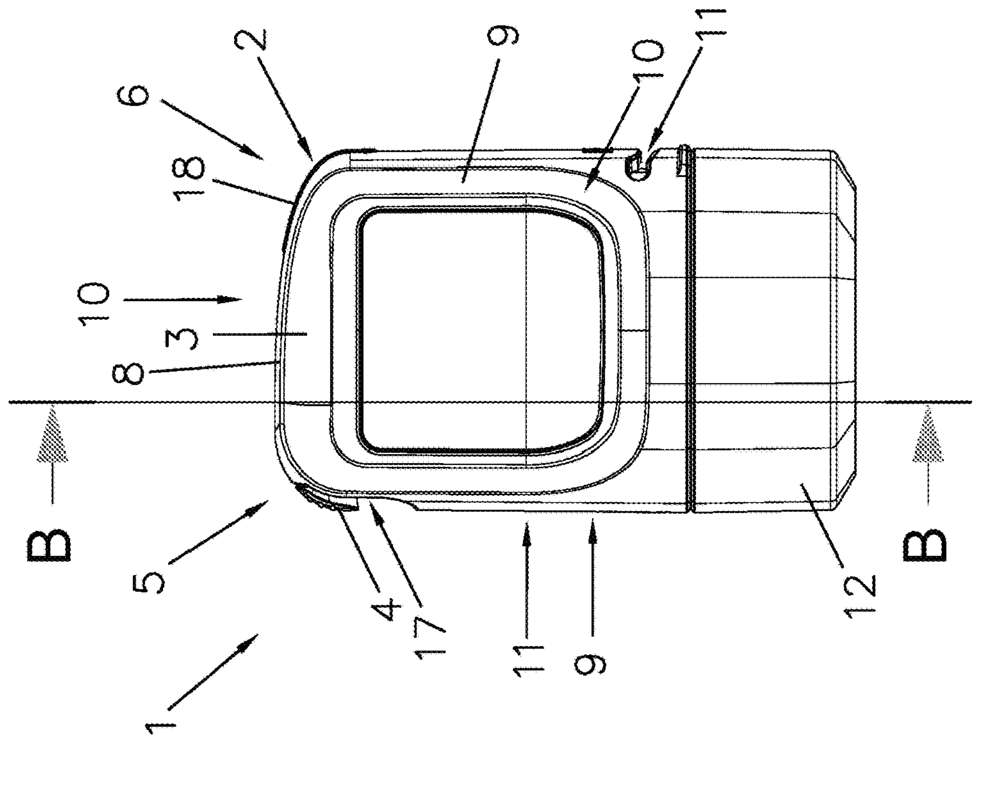
FIG. 1*a* is a lateral view of a stamp according to some embodiments with cutting device, in resting position—simplified, for illustrative purposes only.

In FIG. 1*a*, the stamp 1 is shown in its resting position, in which it is inactive with regard to the stamping process, as well as the actuating mechanism 4 for the cutting device 2, whereby a closure cap 12 can be arranged on the underside of the stamp 1. The optional, detachably connected closure cap 12 can preferably be arranged or provided so as to prevent the stamping ink from drying out or to protect an ink application device 13 (FIG. 1*b*) from dust and dirt or to be able to place the rolling or roller stamp used as an example in the embodiment shown stably on a flat surface, for example at a workplace or desk. In FIG. 1*b*, the stamp 1 is shown in the stamping position without the closure cap 12, whereby the actuating mechanism 4 and thus the cutting device 2 are inactive during the Stamping process in order to avoid the risk of injury to the user of the stamp 1.

On the underside of the stamp 1, i.e. on the side of the stamp 1 opposite the upper side 8 of the top part 3, a receiving area 14 is formed in which the ink application device 13 is arranged. Fastening means 15 can be arranged on the stamp housing in the area of the ink application device 13 to fasten the closure cap 12. The fastening means 15 on the stamp 1 can preferably be formed by protrusions or recesses that correspond to oppositely formed fastening means 16 (FIG. 2*b*), i.e. oppositely formed recesses or protrusions, on the inside of the closure cap. In the exemplary embodiment shown, the fastening means 15 on the stamp 1 is designed as an inclined guide groove, in particular 6 such guide grooves, so that the closure cap 12 can be screwed onto the underside of the stamp 1 by turning the fastening means 16, which is or are designed as point-shaped projections. However, the fastening means 15 and 16 can also be designed as a snap mechanism, for example.

Figure 1C:
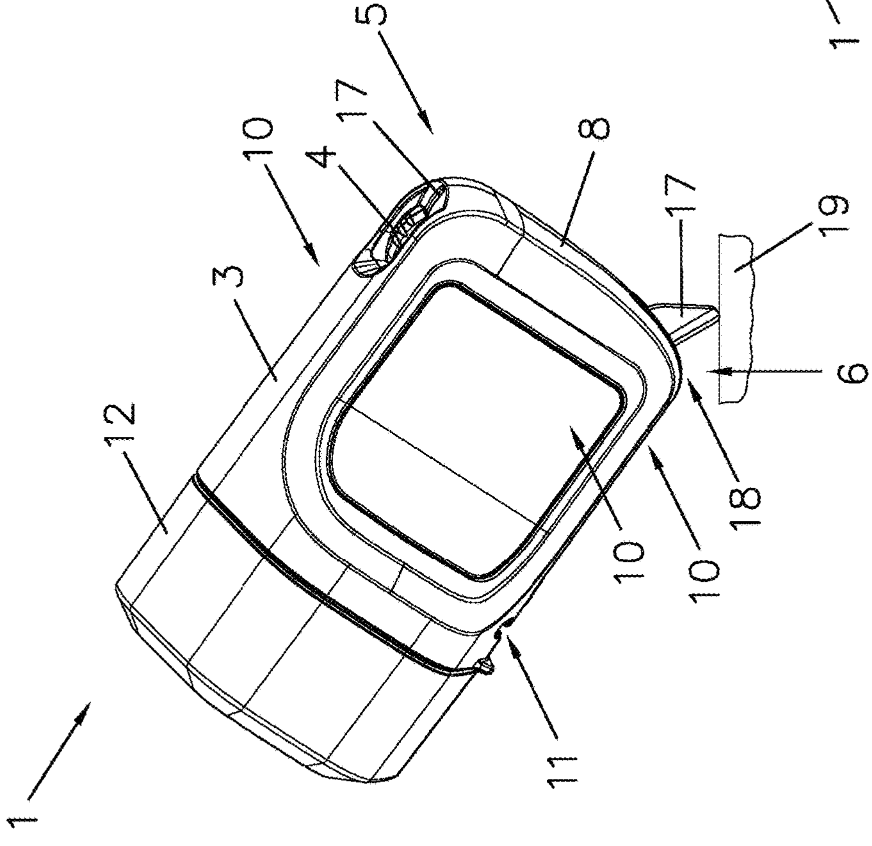
FIG. 1*c* is an illustration of the stamp in the cutting position with activated actuating mechanism or activated cutting device—simplified, for illustrative purposes only.

FIG. 1*c* shows the stamp 1 in the preferred cutting position with activated actuating mechanism 4 and activated cutting device 2. Thus, the actuating mechanism 4 is moved along a preferably slot-shaped recess 17 or opening, whereby the cutting device 2 is pivoted or pushed in the direction of the upper side 8 out of a slot-shaped opening 18. In the cutting position, the stamp 1 is pivoted by more than 90° in relation to the stamping position.

Preferably, the cutting device 2 can be used to cut a wide variety of objects 19 in this way, such as paper, cardboard, film, packaging, etc. When the actuating mechanism 4 is activated or actuated, the cutting device 2 pivots out of the top part 3 of the stamp 1 in the direction of the upper side 8 or upwards, whereas the actuating mechanism 4 pivots in the opposite direction, i.e. towards the ink application device 13 or the underside of the stamp 1. If a closure cap 12 is present, it is preferably put on or turned on during the cutting process, in particular to prevent the user from coming into contact with the ink application device 13 during cutting. There are also other types of stamps that do not pose a risk of soiling even without a closure cap 12 (e.g. self-inking stamps FIGS. 9 and 11).

Figure 2A:
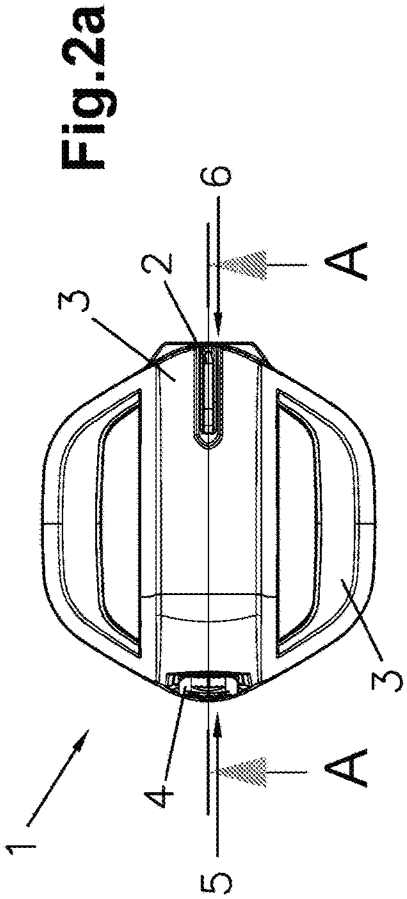
FIG. 2*a* is a top view of the stamp according to FIG. 1*a*—simplified, for illustrative purposes only.
Figure 2B:
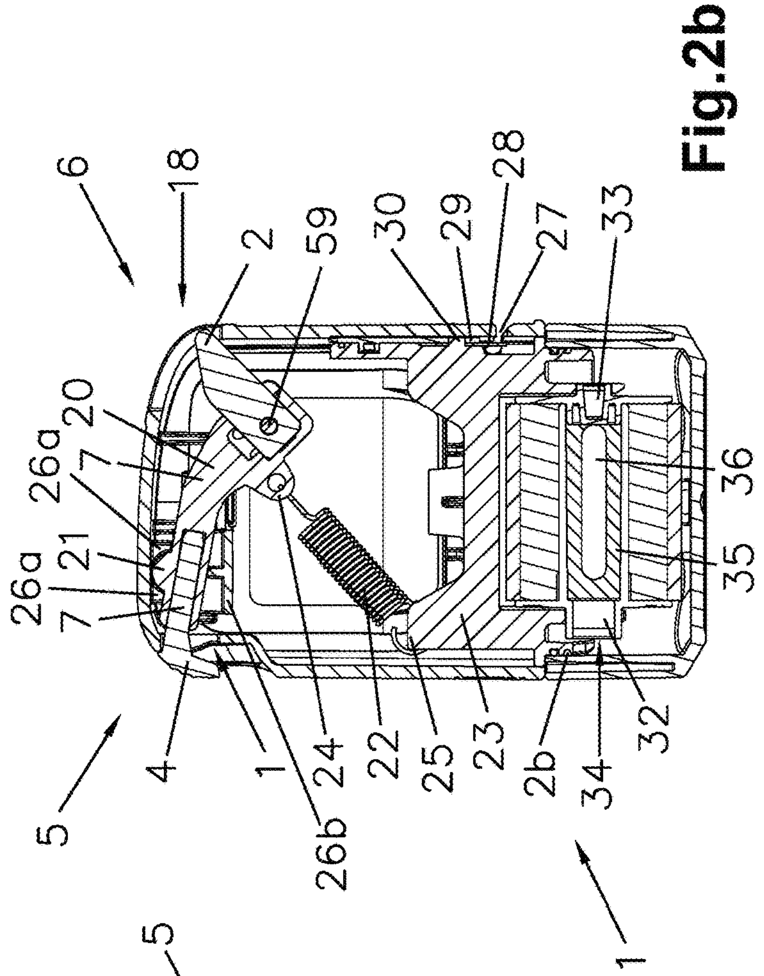
FIG. 2*b* is a sectional view of the stamp according to lines A-A in FIG. 2*a*—simplified, for illustrative purposes only.
Figure 3:
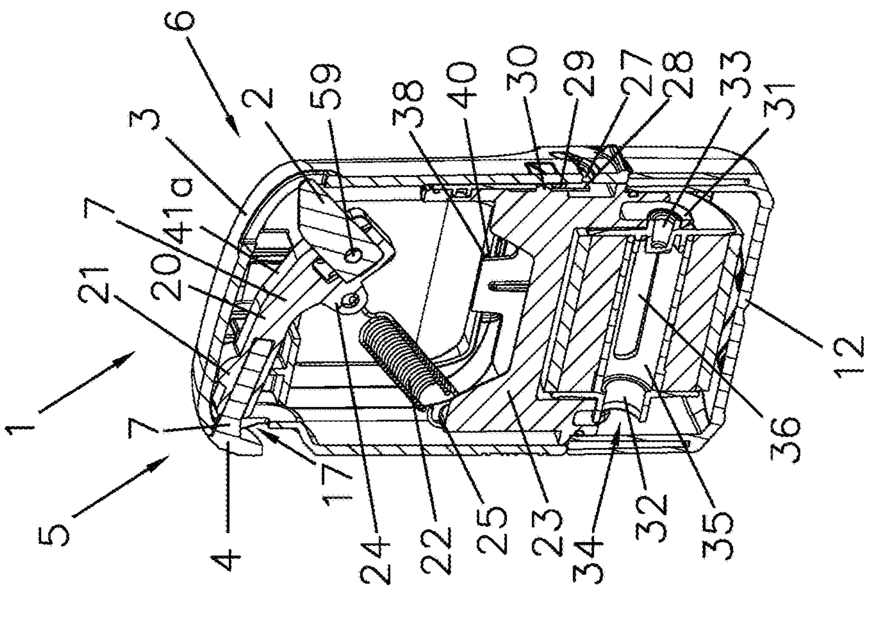
FIG. 3 is an oblique view of the sectional view according to FIG. 2*b*—simplified, for illustrative purposes only.
Figure 4:
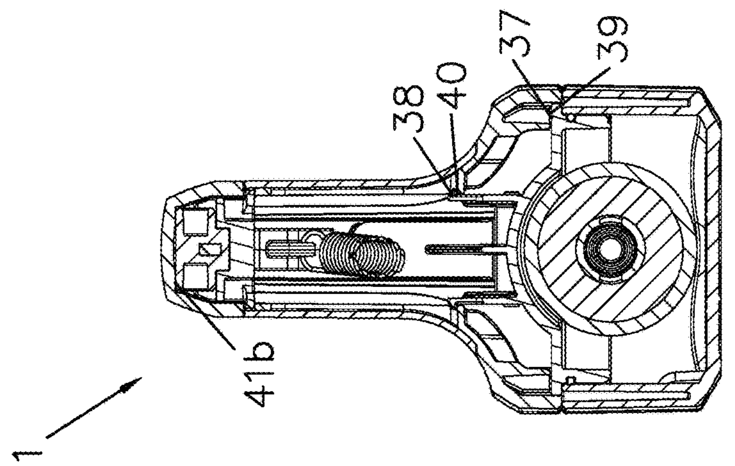
FIG. 4 is a sectional view of the stamp according to lines B-B in FIG. 1*a*—simplified, for illustrative purposes only.

FIG. 2*a* shows a top view of the stamp 1 according to some embodiments with the cutting device 2 and the actuating mechanism 3, and FIG. 2*b* and FIG. 3 show a sectional view corresponding to the lines A-A in FIG. 2*a*.

Preferably, the pivoting mechanism 7 is formed from at least one pivot lever 20, to which the cutting device 2 is attached, and the actuating mechanism 4. However, it is also possible to form the pivot lever 20 together with the actuating mechanism 4 in one piece. The pivoting mechanism 7, in particular the pivot lever 20, has a bearing axle 21, so that when the actuating mechanism 4 is activated or actuated in the direction of the underside of the stamp 1, the cutting device 2 can be pivoted in the direction of the upper side of the stamp 1. As shown, the bearing axle 21 is preferably arranged closer to the actuating mechanism 4 than to the cutting device 2. This ensures that the cutting device 2 pivots further out of the stamp 1 when the actuating mechanism 4 is activated, i.e. that a greater adjustment path of the cutting device 2 than the actuating path of the actuating mechanism 4 is created. Of course, the bearing axle 21 can be arranged along the entire length of the pivoting mechanism 7 inside the housing, for example closer to the cutting device 2, e.g. in the middle area of the pivoting mechanism 7. The closer the bearing axle 21 is positioned to the cutting device 2, the smaller the pivoting movement of the cutting device 2 is in relation to the pivoting movement of the actuating mechanism 4.

To return the cutting device 2, in particular to the inside of the stamp housing, i.e. to a position in which the cutting device 2 preferably does not protrude beyond the outside of the top part 4, a retaining or return mechanism 22, in particular designed as a return spring, can be arranged, which is or can be connected on the one hand to the housing of the stamp 1 or an insertion element 23 mounted therein and on the other hand to the pivoting mechanism 7, in particular on the pivot lever 20. The connection is preferably made via fastening means 24, 25. However, one of the fastening means 24, 25 can also be omitted and the retaining or return mechanism 22 be firmly connected on one side. The retaining or return mechanism 22 is preferably attached to the pivoting mechanism 7 in the area of the cutting device 2, but can also be arranged at another point of the pivoting mechanism 7 between the bearing axle 21 and the cutting device 2.

The cutting device 2 is preferably rigidly attached to the pivot lever 20. In the exemplary embodiment shown, the pivot lever 20 is curved and the cutting device 2 arranged essentially at right angles to the pivot lever 20. The angled design of the pivot lever 20 ensures, among other things, that more space is created for the cutting device 2, in particular the inserted blade. Thus, the cutting device 2 is fully accommodated by the top part 3 in the resting position. Of course, the pivot lever 20 can also be straight or with a different angle, just as the cutting device 2 can also be arranged at a different angle to the pivot lever 20.

Since the bearing axle 21 can be arranged at various positions of the pivoting mechanism 7, and the pivot lever 20 and/or the cutting device 2 can be angled in a variety of ways and the position and force effect of the retaining or return mechanism 22 can also be varied, the pivoting movement, the angle of the cutting device 2 or the blade and the force required to activate the actuating mechanism 4 can be precisely set or adjusted.

Bearing means 26*a*, 26*b*, in particular bearing shells, can be arranged for better support or guidance of the bearing axle 21. The bearing means 26*b* is preferably designed to be removable, in particular in the case of a one-piece design of the top part 3. In the case of a one-piece design of the top part 3, the pivotably arranged bearing axle 21 of the pivot lever 20 is supported by a separable bearing using the bearing means 26*a*, 26*b*, i.e. the bearing means 26*a* in the top part 3 is preferably formed in one piece, into which the bearing axle 21 of the pivot lever 20 can be inserted, onto which the further bearing means 26*b* is then placed, so that the bearing axle 21 is completely mounted in a bearing bush formed by the two bearing means 26*a*, 26*b*. In the same way, however, the bearing means 26*b* can also be formed in the housing of the stamp 1, or a complete bearing holder can be formed in the housing, in particular with a half-shell design of the top part 3 or with a lateral aperture for inserting the bearing axle 21.

The optionally arranged further cutting device 11 is preferably formed on the side face 9 of the top part 3, in particular on the side face 9 on which the cutting device 2 is arranged in the upper area. However, it is also possible to arrange the cutting device 11 on the upper side 8 of the top part 3. Preferably, the cutting device 11 is formed by a recess 27, in particular a slot-shaped recess 27, in the housing of the top part 3, and a cutting means 28, in particular a blade, arranged inside the housing. The cutting means 28 is preferably positioned at a distance from the housing wall via a spacer element 29 and, in particular, arranged so as to be pivotable in the direction of the longitudinal extent of the slot-shaped recess 27, preferably horizontally pivotable. Here, the cutting means 28 is preferably arranged on the optional insertion element 23 or directly on the inside of the top part 3 of the stamp 1. It is fixed to the insertion element 23 or to the top part 3 in the stamp housing in particular via a fastening means 30, which is designed like an axle and thus enables a pivoting movement. Limit stops can be arranged on the insertion element 23 or on the inside of the housing to limit the pivoting movement of the cutting means 28. The cutting device 11 is thus preferably designed as a letter opener, whereby whenever an envelope is inserted into the recess 27 and pulled through along the longitudinal extent of the recess 27, the cutting means 28 is slightly pivoted and the envelope slit open. The arrangement of the spacer element 29 and the pivotable mounting of the cutting means 28 prevent the cutting means 28 from being clogged.

In the housing of the stamp 1, the ink application device 13 is attached to the underside of the insertion element 23 in the exemplary embodiment shown. Preferably, the insertion element 23 has shell-shaped projections 31 (FIG. 1*b*), which include the axle extensions 32, 33 of the ink application device 13, which are formed on an axle body 35, in particular detachably. Such cup-shaped projections 31 can of course also be arranged directly on the housing of the stamp 1, in particular on the top part 3. One of the two axle extensions 32, 33 of the ink application device 13, in the exemplary embodiment shown the axle extension 32, preferably has a larger diameter than the other axle extension 33 and an opening 34 for filling or refilling ink. As the second axle extension 33 is preferably closed, the axle body 35 is hollow and further recesses 36 are arranged in the axle body 35, the ink application device 13 can be re-impregnated or filled with ink from the inside in a simple manner.

The insertion element 23 can preferably include the cutting means 28, spacer element 29, projections 31 and the fastening means 25. The retaining or return mechanism 22 can likewise be attached or arranged directly on the insertion element 23. However, it is also possible to form some or all of these means and elements in the top part 3, or to omit the insertion element 23 completely. When the insertion element 23 is used, it is preferably designed in such a way that a support surface 37 and a latching element 38 are provided on the insertion element 23, whereby a support surface 39 and a latching surface 40 are formed in or on the top part 1. When the support surface 37 is in contact with the support surface 39, the latching element 38 latches with the latching surface 40. Preferably, the insertion element 23 is thus held against displacement into the receiving area 14 via the support surfaces 37, 39 and against displacement towards the underside of the stamp 1 via the latching connection or the latching element 38, which is formed in particular as a snap-in nose. The latching element 38 is preferably designed to be releasable.

FIG. 5 shows the cutting device 2 and the actuating mechanism 4 in the activated or actuated position. An example of the pivoting movement can be taken from the synopsis of FIG. 2*b* and FIG. 5. The force effect of the retaining or return mechanism 22 acts essentially preferably in the opposite direction to the pivot direction of the cutting device 2. Such a solution of the pivoting movement and return ensures that the cutting device 2, when cutting on an object 19, exerts a pressing force against the restoring force of the holding or return mechanism 22, and thus preferably the cutting device 2 is held in its actuated position, whereby the force required to actuate or hold actuated the actuating mechanism 4 is reduced or can be reduced.

Upon actuation or activation of the actuating mechanism 4, i.e. when the actuating mechanism 4 is moved along the slot-shaped recess 17 (better shown in FIG. 1*c*), the cutting device 2 pivots in the opposite direction. Preferably, a contact surface 41*a* is provided on the pivoting mechanism 7 or on the pivot lever 20, which comes into contact with an inner side 41*b* of the top part 3, in particular the upper side 8 inside the stamp 1, in particular when the cutting device 2 is extended or activated, and limits the cutting device 2 before it pivots further outwards. Furthermore, a stop surface 42, which is formed in the end region of the slot-shaped opening 18, can limit the cutting device 2 against the compressive force during cutting. This can give the cutting device 2 additional stability.

Figure 7:
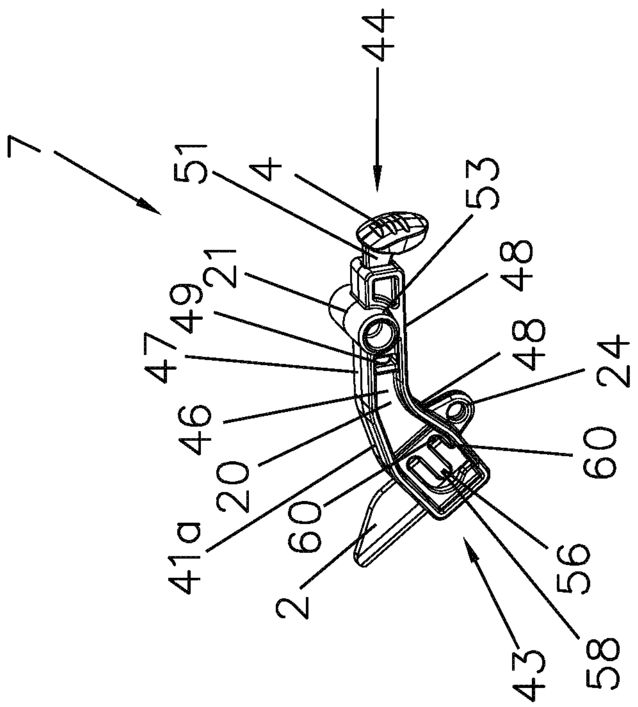
FIG. 7 is an illustration of the pivoting mechanism together with the fixed cutting device 2—simplified, for illustrative purposes only.
Figure 6:
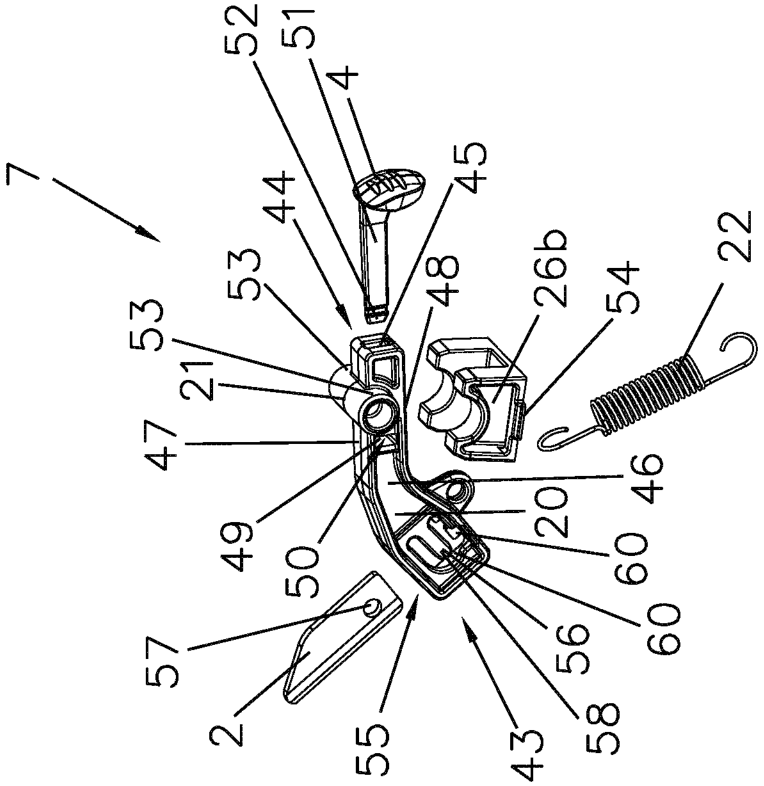
FIG. 6 is an exploded view of the pivoting mechanism including bearing means and retaining or return mechanism—simplified, for illustrative purposes only.

FIGS. 6 and 7 show the pivoting mechanism 7 without components of the stamp 1, where FIG. 6 shows an exploded view of the pivoting mechanism 7 together with the parts preferably arranged thereon, such as the bearing means 26*b* and the retaining or return mechanism 22, and FIG. 7 shows the pivoting mechanism 7 with attached pivot lever 20 and cutting device 2.

The pivoting mechanism 7 preferably includes the pivot lever 20 and the actuating mechanism 4, whereby it can of course also include additional parts or be subdivided differently or into additional parts. A one-piece embodiment is also possible. On the pivoting mechanism 7 or pivot lever 20, the cutting device 2 is arranged in one end region 43, and the actuating mechanism 4 is arranged in the opposite end region 44. In particular in the case of a two-part or multi-part design of the pivoting mechanism 7, the pivot lever 20 preferably has a recess or opening 45 in the end region 44 on the end face and a further recess 49 on a side face 46 or on an upper side 47 or underside 48, whereby the opening 45 is connected to the recess 49. In this preferred embodiment, a latching edge 50 is formed by the arrangement of the opening 45 and recess 49 on different sides of the pivot lever 20 or by the openings/recesses directed at an angle to each other. The fact that the actuating mechanism 4 preferably includes an extension 51, on which a latching element 52 can be arranged, enables a simple connection to the pivot lever 20. Here, the extension 51 of the actuating element 4 is inserted into the opening 45, whereby the extension 51 is pushed up to the adjacent recess 49, so that the latching extension or the latching element 52 engages at the latching edge 50 and thus the actuating mechanism 4 is connected to the pivot lever 20. Of course, it is also possible to connect the actuating mechanism 4 to the pivot lever 20 in another way, for example by bonding, in which case the recess 49 and the latching element 52 can be omitted. It is also possible that the extension 51 is not formed on the actuating mechanism 4 but on the pivot lever 20. In this case, the actuating mechanism 4 is formed in particular by the actuating knob, whereby in such a solution latching elements are also preferably formed on the actuating knob and on the extension 51 or the connection of the actuating mechanism 4 to the pivot lever 20 can be realized by bonding.

The bearing axle 21 arranged on the pivot lever 20 is preferably arranged in the rear half of the pivoting mechanism 7, as can be better seen from FIG. 7, in particular in the area between the center of the pivoting mechanism 7 and the end region of the actuating mechanism 4 or the actuating surface for the user. The bearing axle 21 is formed at an angle of essentially 90° to the longitudinal course of the pivot lever 20 and preferably has a round cross-sectional shape. Bearing means 26*a*, 26*b* are provided to accommodate projections 53 of the bearing axle 21. Preferably, one of the bearing means 26*a* is formed as a bearing shell or partial shell, in particular a half-shell, and is arranged in the top part 3 of the stamp 1 (FIG. 2*b*), and the second bearing means 26*b* is also designed as a partial shell, in particular a half-shell, which can be subsequently inserted for better assembly. For fixing the bearing means 26*b*, this has fixing means 54, in particular a projection. Of course, it is also possible to provide both bearing means 26*a*, 26*b* in the stamp 1 or to design both so as to be removable. It is also possible to form, instead of partial shells or half-shells, a bearing shell in the top part 3 of the stamp 1, which largely (except for an insertion opening) or completely encompasses the projections 53 of the bearing axle 21.

The cutting device 2 arranged in the front area of the pivoting mechanism 7 or pivot lever 20 is preferably detachably connected to the pivot lever 20. To this end, the pivot lever 20 preferably has a recess 55 into which the cutting device 2 can be inserted or pushed, and furthermore a latching means 56 that engages or is connected to a latching receptacle 57 on the cutting device 2, in particular a recess. The latching means 56 preferably has a movable element 58 with a projection 59 (FIG. 2*b*). In addition, the recess 55 can accommodate guide or limiting means 60. This allows a fixed arrangement of the cutting device 2 in the pivot lever 20, so that it is fixed in its position in the pivot lever 20. Preferably, the movable element 58 holds the cutting device 2 via the projection 59, in particular on the latching receptacle 57. In this way, the cutting device 2 can be secured against falling out against the insertion direction of the cutting device 2 into the pivot lever 20. The cutting device 2 can preferably be changed in such a way that the projection 59 is pushed out of the latching receptacle 57. In the exemplary embodiment shown, the recess 55 is arranged on the upper side 47 in the front area of the pivot lever 20. However, it can also be arranged directly in the end region 43 on the end face of the pivot lever 20. The holding mechanisms for the cutting device 2 in the pivot lever 20 can also be designed differently, and/or the cutting device 2 can be non-detachably connected to the pivot lever 20, for example by bonding. In case of bonding, the latching means 56, the latching receptacle 57, the movable element 58 together with the projection 59 and the guiding or limiting means 60 can also be omitted.

As shown, the pivot lever 20 can be formed curved in its longitudinal extension. However, it can also be straight or have several bow edges or be curved. Preferably, however, the pivot lever 20 has the contact surface 41*a*, which in particular serves as the contact surface 41*a* on the inside of the stamp 1. The pivoting movement is limited by the contact surface 41*a* on the inside of the top part 3 of the stamp 1 when the actuating mechanism 4 is activated or actuated. If the contact surface 41*a* is provided, not only is the maximum extension width of the cutting device 2 limited, but greater stability is also achieved, particularly when cutting an object 19 (as shown in FIG. 1*c*), because the force exerted on the pivoting mechanism 7 or pivot lever 20 is increased by the user pressing down.

The fastening means 24 for the retaining or return mechanism 22 is preferably attached in the front area on the underside 48 of the pivoting mechanism 7 or pivot lever 20. Of course, the fastening means 24 can also be attached in other areas of the pivot lever 20, for example on the side faces 46 or the upper side 47. Preferably, the retaining or return mechanism 22 is formed as a resilient element, in particular a tension spring. The retaining or return mechanism 22 can, however, also be formed as a compression spring and be arranged or attached, for example, on the upper side 47 of the pivot lever 20. However, the retaining or return mechanism 22 can also be arranged in the end region 44, in which case the force acting in the end region 44 is opposite to that acting in the end region 43, and in this case a retaining or return mechanism 22 is used in which the tensile force acts from above and/or compressive force acts from below. In such an embodiment, the retaining or return mechanism 22 can, for example, be designed as an upwardly directed tension spring or a compression spring acting from below.

Figure 8:
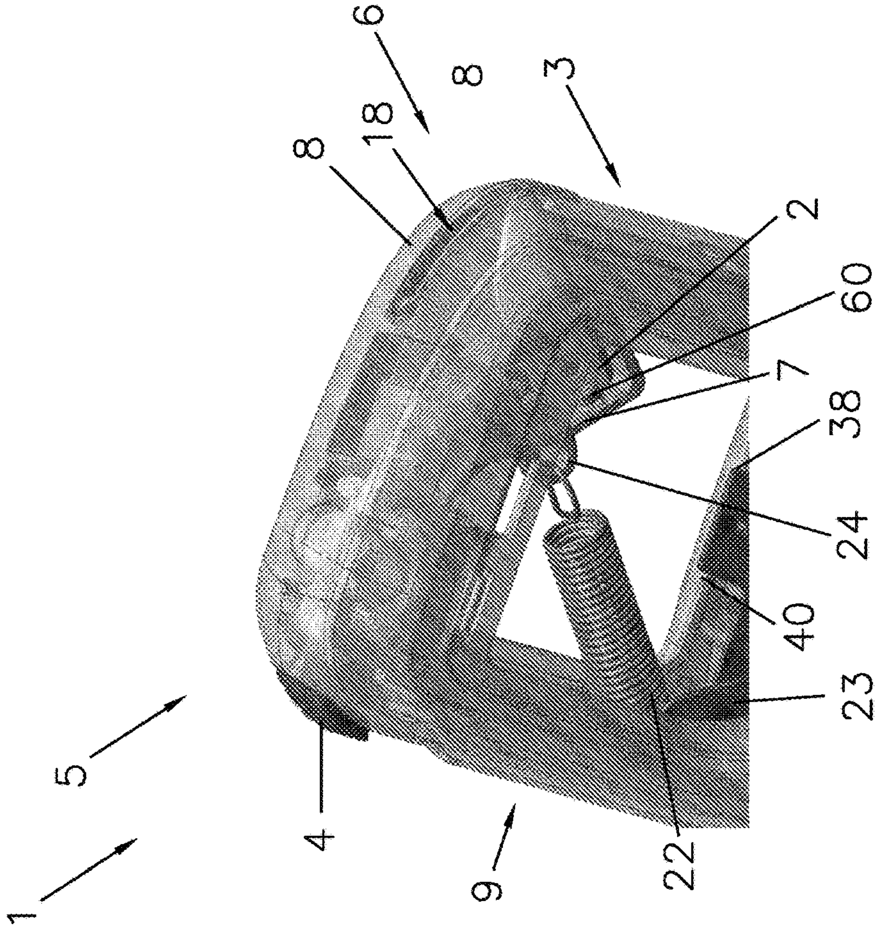
FIG. 8 is a schematic rendering of a cutting device installed in the top part of the stamp with surfaces of the top part shown transparent for better visualization.

To better illustrate the preferred arrangement and design of the cutting device 2, FIG. 8 shows a rendering of a cutting device 2 installed in the top part of the stamp 1, whereby in particular partial surfaces of the top part 3 are shown transparent and the cutting device 2 is shown in its initial or inactive position, in which the cutting device 2 is completely recessed in the housing of the stamp 1. Basically, it can be said that the stamp 1 with cutting device 2 functions in such a way that by pushing the actuating element 4 from its resting position, as shown in FIG. 1*a*, into its activated position, as shown in FIG. 1*c*, the pivot lever 20 is pivoted over the bearing axle 21 so that the cutting device 2 attached to the pivot lever 20 is pivoted outwards out of the top part 3. If the cutting device 2 is no longer needed, the actuating element 4 can be released so that the cutting device 2 is pulled into the interior of the top part 3 due to the retaining or return mechanism 22, whereby the actuating element 4 is pivoted into the resting position due to the bearing axle 21.

Figure 9:
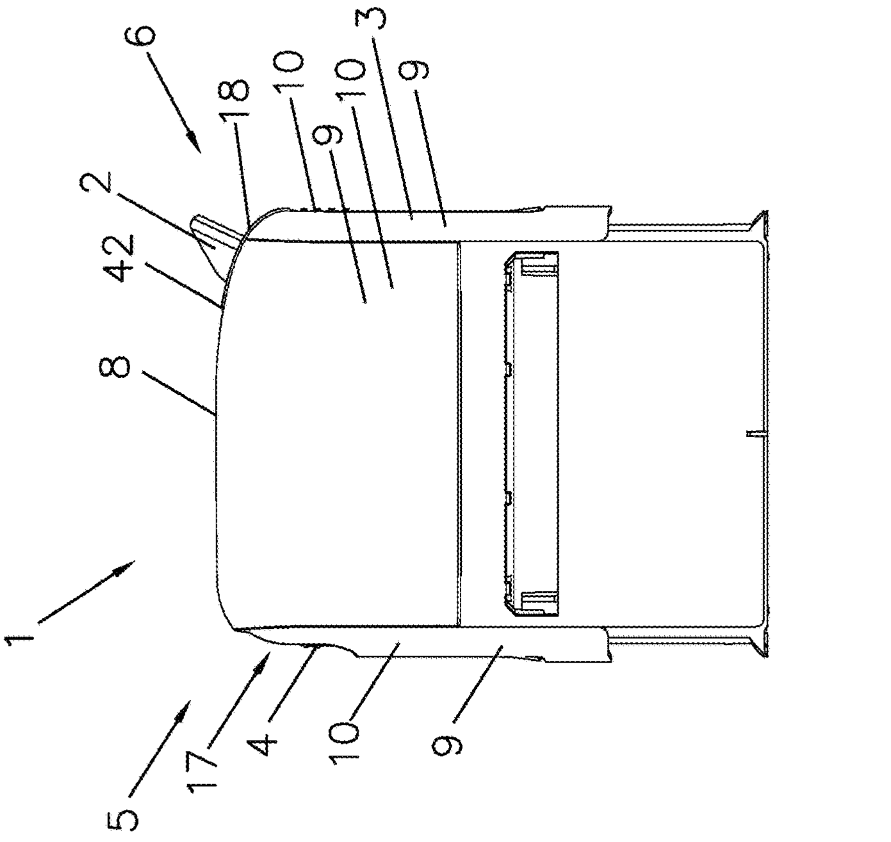
FIG. 9 is a lateral view of a self-inking stamp with cutting device, in simplified, schematic representation—simplified, for illustrative purposes only.
Figure 11:
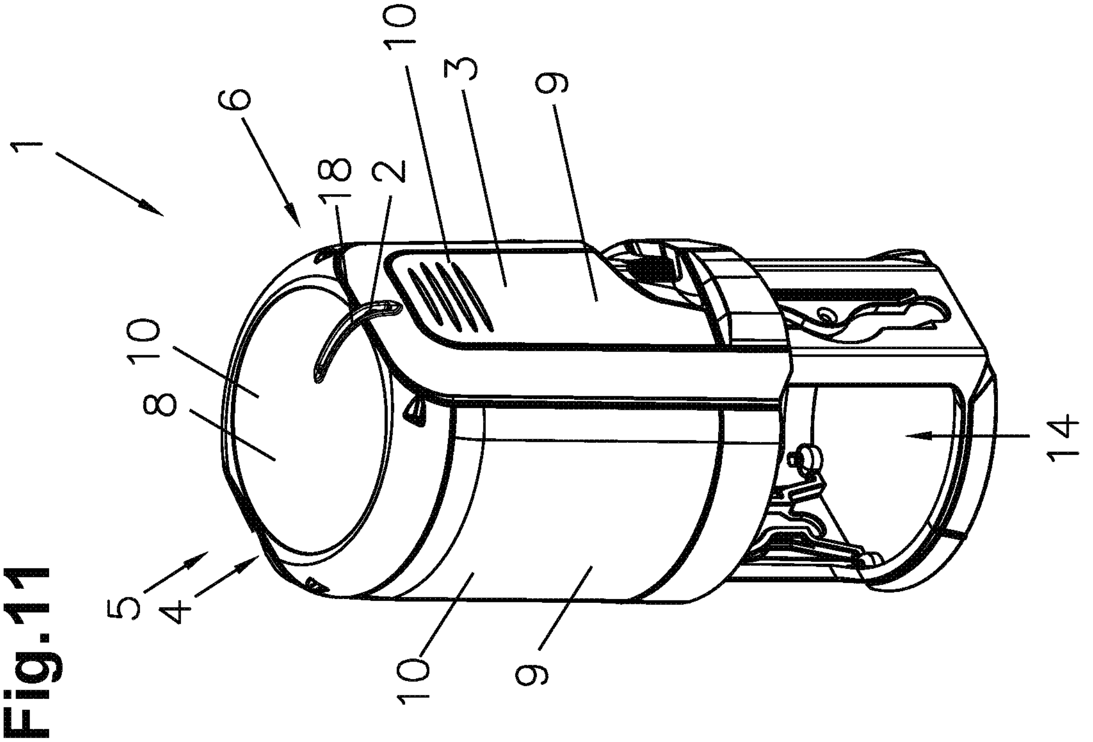
FIG. 11 is a lateral view of a round stamp with cutting device—simplified, for illustrative purposes only.
Figure 10:
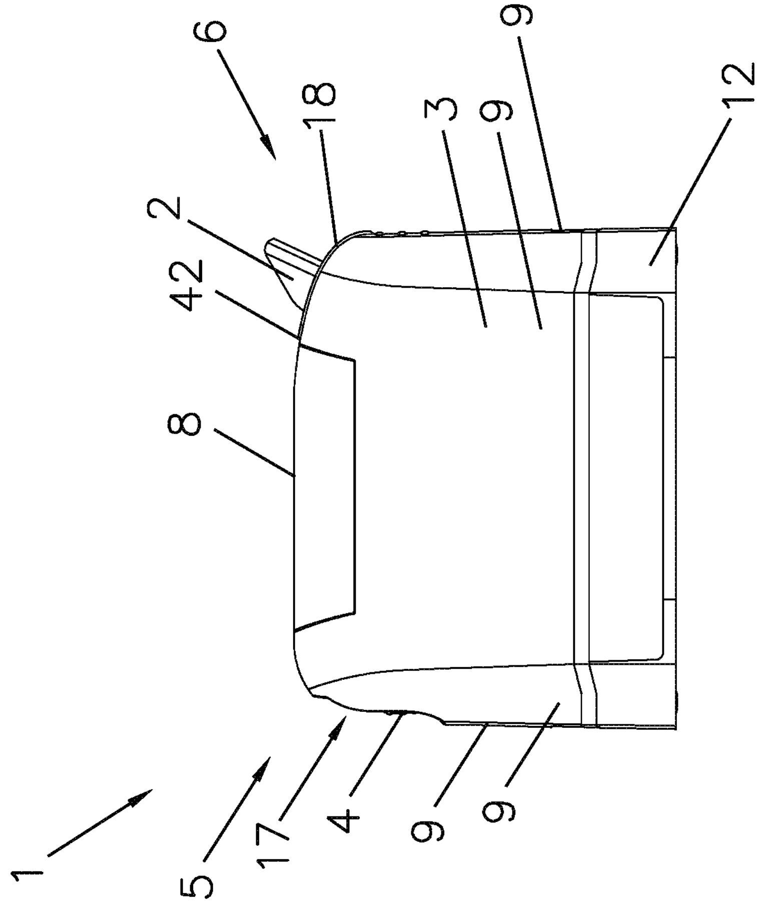
FIG. 10 is a lateral view of a flash stamp with cutting device—simplified, for illustrative purposes only.

FIGS. 9 to 11 show other embodiments of stamps 1 with activated cutting device 2 or actuated actuating mechanism 4. The cutting device 2 according to some embodiments can be formed or provided in a wide variety of stamps 1, namely both in different types of stamps, such as self-inking stamps 1 (FIG. 9, FIG. 11), pre-ink stamps 1, in particular flash stamps 1 (FIG. 10), roller stamps (FIG. 1*b*), etc., as well as stamps 1 in different designs, such as rectangular or square stamps 1 (FIG. 9, FIG. 10), oval or square stamps 1 (FIG. 11), as well as stamps 1 in different designs, such as rectangular or square stamps 1 (FIG. 9, FIG. 10), oval or round stamps 1 (FIG. 11).

The various types and designs of the stamps 1 preferably have the upper side 8 of the top part 3 in the upper end region and the ink application device 13 in the opposite end area or in the receiving area 14, whereby the cutting device 2 together with the pivoting mechanism 7 is preferably arranged in the upper end region.

Application of the cutting device 2 of the stamp 1, in which the cutting device 2 and an actuating mechanism 4 are arranged in the top part 3 so as to move synchronously and preferably a closure cap 12 for closing the ink application device 13 is attached to the stamp 1, is carried out in such a way that when the actuating mechanism 4 is activated or actuated, it is pivoted in the opposite direction to the direction of movement of the cutting device 2, whereby the actuating mechanism 4 is pivoted in the direction of the closure cap 12 or ink application device 13, whereby, when the actuating mechanism 4 is deactivated, it is locked via a retaining or return mechanism 22 to the initial position in which the cutting device 2 is arranged inside the top part 3.

Finally, it should be noted that the description primarily focuses on the device, with all technical features of the device being equally applicable, mutatis mutandis, to a corresponding method.

The invention is not limited to the embodiments shown, but may also include other designs and structures.

The invention claimed is:

1. A stamp with a cutting device, a grip area arranged on an outer housing of a top part, and a receiving area, in which an ink application device is arranged, whereby the cutting device and an associated actuating mechanism are arranged on the top part, and the actuating mechanism is designed for activating and/or locking the cutting device, wherein the actuating mechanism and the cutting device are arranged at opposite corner regions of the top part and connected to each other via a pivoting mechanism.

2. The stamp according to claim 1, wherein the pivoting mechanism is formed from at least one pivot lever, to which the cutting device is attached, and the actuating mechanism.

3. The stamp according to claim 2, wherein the cutting device rigidly attached to the at least one pivot lever.

4. The stamp according to a claim 2, wherein the at least one pivot lever comprises an opening for receiving the actuating mechanism.

5. The stamp according to claim 2, in the actuating mechanism or the at least one pivot lever comprises an extension on which a latching element for connecting the actuating mechanism to the at least one pivot lever is arranged.

6. The stamp according to claim 2, wherein the at least one pivot lever comprises a recess which that is connected to an opening of the pivot lever to form a latching edge for a latching element, of the actuating mechanism.

7. The stamp according to claim 2, wherein a bearing means is arranged or can be inserted for fastening and mounting the at least one pivot lever on the top part.

8. The stamp according to claim 2, wherein the cutting device or the at least one pivot lever is held in a starting position against an actuating position via a retaining or return mechanism.

9. The stamp according to claim 8, wherein the retaining or return mechanism for the at least one pivot lever is attached in the top part or on an insertion element.

10. The stamp according to claim 8, wherein the at least one pivoting lever comprises a fastening means for fastening the retaining or return mechanism, which is arranged on wan underside of the at least one pivoting lever.

11. The stamp according to claim 1, wherein the pivoting mechanism comprises a bearing axle for mounting in the top part, which is arranged between the actuating mechanism and the cutting device, whereby the bearing axle is arranged in a rear half of the pivoting mechanism.

12. The stamp according to claim 1, wherein the stamp is designed as a roller stamp, self-inking stamp, flash stamp or pre-ink stamp, whereby the stamp has a substantially rectangular, square, oval or round cross-sectional shape.

13. The stamp according to claim 1, wherein a roller or roll for applying ink is arranged on an insertion element.

14. The stamp according to claim 1, wherein a further cutting device is arranged in the top part, which comprises a slit-shaped cutout.

15. The stamp according to claim 1, wherein a closure cap for covering the ink application device is configured to be attached to the top part or in the receiving area.

16. The stamp according to claim 1, wherein a frame structure of the housing of the top part is formed in one piece.

17. A method for using a cutting device of a stamp, whereby the cutting device and an actuating mechanism are arranged in a top part of the stamp so as to move synchronously, and a closure cap for sealing an ink application device is attached to the stamp, wherein, when the actuating mechanism is activated, the same is pivoted against direction of movement of the cutting device, wherein the actuating mechanism is pivoted in a direction of the closure cap or ink application device, wherein, when the actuating mechanism is deactivated, the same is returned via a retaining or return mechanism into a starting position in which the cutting device is arranged inside the top part.

18. The method according to claim 17, wherein the stamp has the cutting device, a grip area arranged on an outer housing of the top part, and a receiving area, in which the ink application device is arranged whereby cutting device and the associated actuation mechanism are arranged on the top aprt and the actuating mechanism is designed for activating and/or locking the cutting device, whereiun the actuating mechanism and the cutting device are arranged at opposite corner regions of the top part and connected each other via a pivoting mechanism.

* * * * *